United States Patent
Iida et al.

(10) Patent No.: US 7,734,121 B2
(45) Date of Patent: Jun. 8, 2010

(54) BIDIRECTIONAL OPTICAL MODULE

(75) Inventors: Junji Iida, Tokyo (JP); Akio Watanabe, Tokyo (JP); Mikio Uemura, Tokyo (JP); Hideharu Okami, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 350 days.

(21) Appl. No.: 11/905,254

(22) Filed: Sep. 28, 2007

(65) Prior Publication Data

US 2008/0101796 A1    May 1, 2008

(30) Foreign Application Priority Data

Oct. 25, 2006 (JP) ............................. 2006-289576
Dec. 18, 2006 (JP) ............................. 2006-339639

(51) Int. Cl.
*G02F 1/295* (2006.01)
(52) U.S. Cl. ...................... 385/4; 385/1; 385/2; 385/3; 385/15; 385/24
(58) Field of Classification Search ................. 385/1–4, 385/15, 24
See application file for complete search history.

(56) References Cited

U.S. PATENT DOCUMENTS 5,963,349 A * 10/1999 Norte ........................... 398/42
7,510,338 B2 * 3/2009 Sakuramoto et al. .......... 385/92

FOREIGN PATENT DOCUMENTS

| JP | 3062949 | 7/2000 |
|---|---|---|
| JP | 2002-156554 | 5/2002 |
| JP | 3288976 | 6/2002 |
| JP | 2006-514751 | 5/2006 |
| WO | WO 2004/019070 A2 | 3/2004 |

* cited by examiner

*Primary Examiner*—Jennifer Doan
(74) *Attorney, Agent, or Firm*—Kratz, Quintos & Hanson, LLP

(57) ABSTRACT

A bidirectional optical module having a device 1 for emitting transmitting signal light, an optical fiber 8 which the transmitting signal light from the device enters, a light-receiving device 9 which light from the optical fiber enters, and a wavelength splitting filter 4. The transmitting signal light emitted from the device is sent forward through the optical fiber, and the receiving signal light is received through the optical fiber. The bidirectional optical module has an optical device (optical isolator) of a reflection polarizer 6 bonded to an end face of the optical fiber, a Faraday rotator 5 disposed integrally on the reflection polarizer and an absorption polarizer 3 disposed on an optical path extending between the device and the filter. The reflection polarizer has a wavelength dependency which functions as a polarizer for the transmitting signal light, but does not function as a polarizer for the receiving signal light.

9 Claims, 6 Drawing Sheets

Fig.1A
Fig.1B
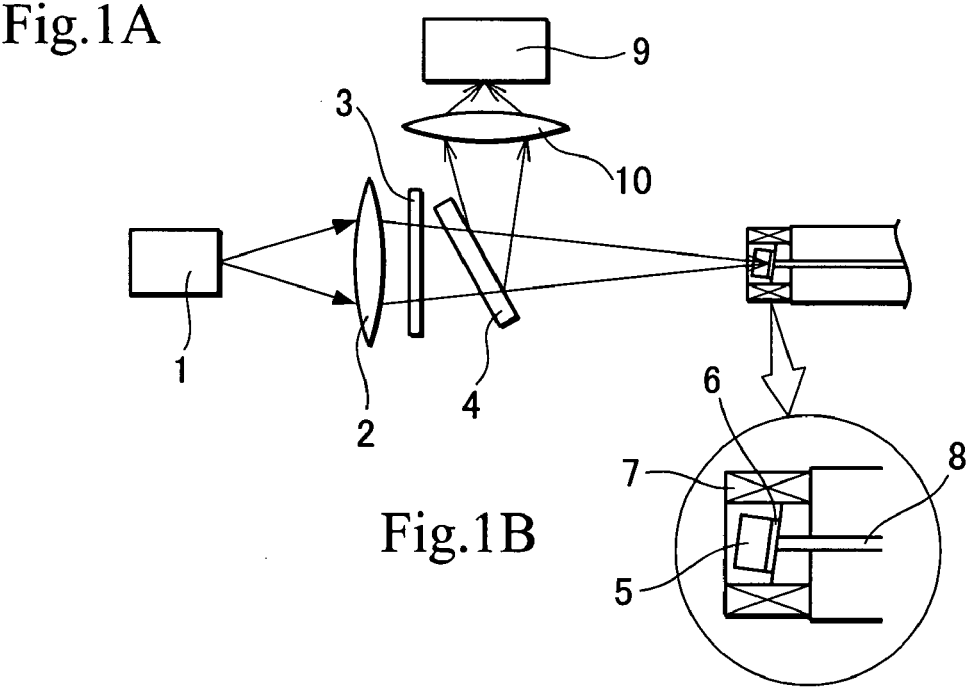
Fig.2A
Fig.2B
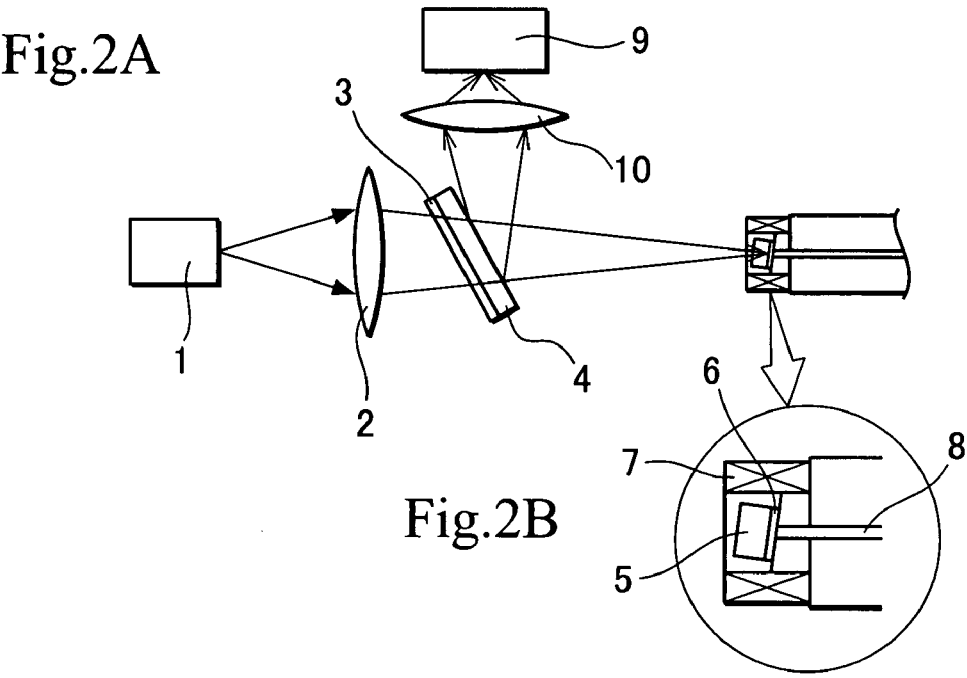

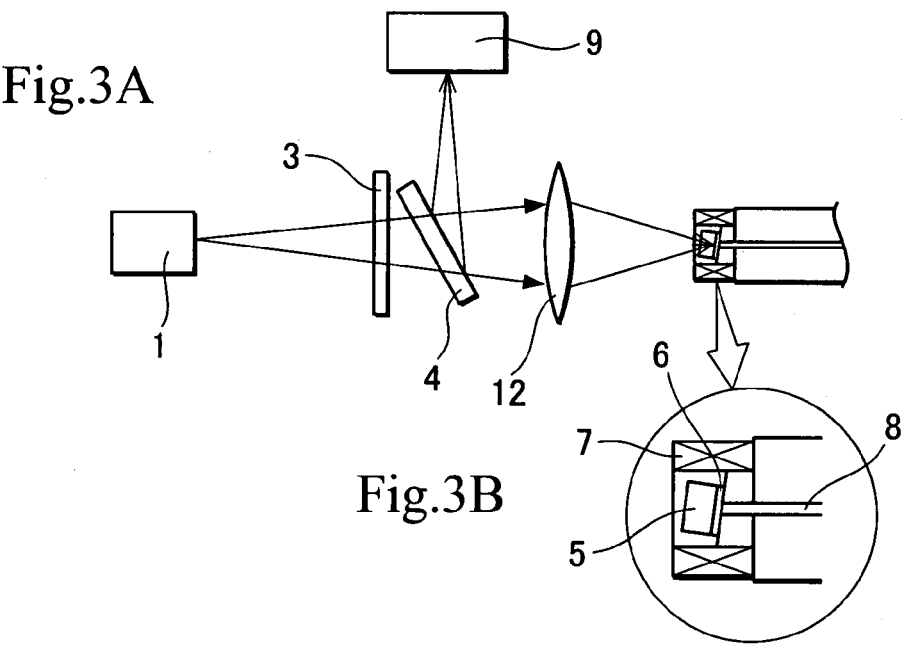
Fig.3A
Fig.3B
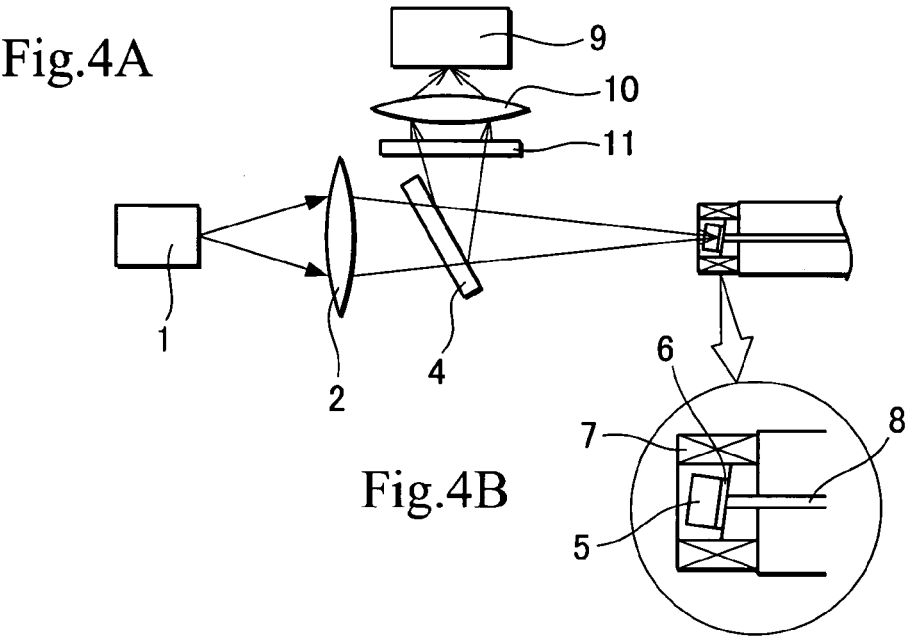
Fig.4A
Fig.4B

BIDIRECTIONAL OPTICAL MODULE

BACKGROUND OF THE INVENTION

1. Field of the Invention

This invention is concerned with a bidirectional optical module which transmits and receives light signals through a single optical fiber shared in common, and relates to an improvement of the bidirectional optical module, which is achievable of more cost reduction than the conventional.

2. Description of the Related Art

With expansion of optical fiber communication networks, a communication system which sends optical signals bidirectionally by the use of a single optical fiber is on the way to its introduction. In such bidirectional optical communication, a bidirectional optical module is used in order to transmit and receive light signals with different wavelengths.

The construction of a conventional bidirectional optical module is schematically shown in FIG. 10.

In the bidirectional optical module shown in FIG. 10, transmitting signal light with a wavelength $\lambda 1$ (e.g., 1,310 nm) which has been emitted from a light-emitting device 101 is collected by a first coupling lens 102, passes through a wavelength splitting filter 103, and is thereafter made to enter an optical fiber 108 so as to be sent forward therethrough. On the other hand, receiving signal light with a wavelength $\lambda 2$ (e.g., 1,490 nm) which has been sent backward through and made to emerge from the optical fiber 108 is reflected by the wavelength splitting filter 103, and is collected by a second coupling lens 110 to come to enter a light-receiving device 109, where signals are detected.

Where a distributed feedback laser (DFB laser), which has a high performance but tends to be affected by reflection return light (reflected return light), is used in the light-emitting device 101, an optical isolator constituted of a polarizer 104, a Faraday rotator 105, an analyzer 106 and a magnet 107 is disposed on an optical path extending between the first coupling lens 102 and the wavelength splitting filter 103. Where the light is one in the direction perpendicular to the polarization of light emitted from the light-emitting device 101, the polarizer 104 may be omitted because it hardly takes part in making oscillation unstable. An example of such a bidirectional optical module is disclosed in Japanese Patent No. 3062949.

Now, in the conventional bidirectional optical module having the above optical isolator, the optical isolator is disposed at a position where the beam diameter of the transmitting signal light emitted from the light-emitting device 101 is large (i.e., on the optical path extending between the first coupling lens 102 and the wavelength splitting filter 103). Hence, in respect of component parts (optical elements) such as polarizers and a Faraday rotator which constitute the optical isolator, those having a large aperture diameter (required to be about 1 mm at least) have had to be used, resulting unavoidably in a high cost.

As a conventional technique by which an optical isolator having a small aperture diameter can be set in, an optical module is known in which an optical isolator constituted of a pair of absorption type polarizers and a Faraday rotator which have integrally been set up is bonded at a position where the beam diameter becomes smallest (i.e., bonded to the optical fiber end) (see Japanese Patent Application Laid-open No. 2002-156554). However, the absorption type polarizers may inevitably function as polarizers not only for the transmitting signal light but also for the receiving signal light to come to loss factors, and hence it has been unable to use such an optical isolator in any bidirectional optical module.

SUMMARY OF THE INVENTION

The present invention has been made taking note of such problems. Accordingly, an object of the present invention is to provide a bidirectional optical module fitted with a low-cost optical device (optical isolator), and further to provide a bidirectional optical module fitted with an optical device having a smaller number of component parts (optical elements) than the optical isolator.

More specifically, according to a first embodiment of the present invention, it is a bidirectional optical module comprising a light-emitting device for emitting transmitting signal light therefrom, an optical fiber which the transmitting signal light emitted from the light-emitting device is made to enter, a light-receiving device which receiving signal light made to emerge from the optical fiber is made to enter, and a wavelength splitting filter provided at a position that fulfills a requirement that the filter is on an optical path extending between the light-emitting device and the optical fiber and on an optical path extending between the light-receiving device and the optical fiber; the transmitting signal light emitted from the light-emitting device being sent forward through the optical fiber, and the receiving signal light being sent backward through the optical fiber and received by the light-receiving device, which receiving signal light is of at least one wavelength different from the wavelength of the transmitting signal light; wherein;

the bidirectional optical module comprises an optical device consisting essentially of a reflection type polarizer bonded to an end face of the optical fiber or disposed in proximity thereto, a Faraday rotator disposed integrally on the reflection type polarizer or disposed in proximity thereto and an absorption type polarizer disposed on an optical path extending between the light-emitting device and the wavelength splitting filter, and the reflection type polarizer has a wavelength dependency that it functions as a polarizer for the transmitting signal light but does not function as a polarizer for the receiving signal light.

According to a second embodiment of the present invention, it is a bidirectional optical module comprising a light-emitting device which is formed of a semiconductor laser having a high linear-polarization performance and is for emitting transmitting signal light therefrom, an optical fiber which the transmitting signal light emitted from the light-emitting device is made to enter, a light-receiving device which receiving signal light made to emerge from the optical fiber is made to enter, and a wavelength splitting filter provided at a position that fulfills a requirement that the filter is on an optical path extending between the light-emitting device and the optical fiber and on an optical path extending between the light-receiving device and the optical fiber; the transmitting signal light emitted from the light-emitting device being sent forward through the optical fiber, and the receiving signal light being sent backward through the optical fiber and received by the light-receiving device, which receiving signal light is of at least one wavelength different from the wavelength of the transmitting signal light; wherein;

the bidirectional optical module comprises an optical device consisting essentially of a reflection type polarizer bonded to an end face of the optical fiber or disposed in proximity thereto and a Faraday rotator disposed integrally on the reflection type polarizer or disposed in proximity thereto, and the reflection type polarizer has a wavelength dependency that it functions as a polarizer for the transmitting signal light but does not function as a polarizer for the receiving signal light.

According to a third embodiment of the present invention, it is a bidirectional optical module comprising a light-emitting device for emitting transmitting signal light therefrom, an optical fiber which the transmitting signal light emitted from the light-emitting device is made to enter, a light-receiving device which receiving signal light made to emerge from the optical fiber is made to enter, and a wavelength splitting filter provided at a position that fulfills a requirement that the filter is on an optical path extending between the light-emitting device and the optical fiber and on an optical path extending between the light-receiving device and the optical fiber; the transmitting signal light emitted from the light-emitting device being sent forward through the optical fiber, and the receiving signal light being sent backward through the optical fiber and received by the light-receiving device, which receiving signal light is of at least one wavelength different from the wavelength of the transmitting signal light; wherein;

the wavelength splitting filter has a polarized-light separating function that the same polarized light as the transmitting signal light emitted from the light-emitting device passes through the filter but any polarized light perpendicular thereto does not pass through the filter; and the bidirectional optical module comprises an optical device consisting essentially of a reflection type polarizer bonded to an end face of the optical fiber or disposed in proximity thereto and a Faraday rotator disposed integrally on the reflection type polarizer or disposed in proximity thereto, which reflection type polarizer has a wavelength dependency that it functions as a polarizer for the transmitting signal light but does not function as a polarizer for the receiving signal light, and further comprises a cut filter provided on an optical path extending between the wavelength splitting filter and the light-receiving device, which cut filter permits the receiving signal light to pass through but cuts off the transmitting signal light.

In the bidirectional optical module according to the first embodiment of the present invention, one of the two polarizers constituting the optical device (optical isolator) is set as the reflection type polarizer, and the reflection type polarizer which does not come to loss factors for the receiving signal light and the Faraday rotator are disposed at a position where the beam diameter becomes smallest (i.e., in the vicinity of the optical fiber end). Hence, the aperture diameter necessary for the reflection type polarizer and the Faraday rotator each can be made small (for example, a reflection type polarizer and a Faraday rotator may be used each having an aperture diameter of approximately from about 0.3 mm to 0.5 mm). This therefore enables achievement of the reduction of production cost.

In the bidirectional optical module according to the second embodiment of the present invention, the use of the light-emitting device formed of a semiconductor laser having a high linear polarization performance can enjoy omission of the absorption type polarizer. Hence, this enables achievement of further reduction of production cost, correspondingly to the number of component parts that can be made smaller than the bidirectional optical module according to the first embodiment of the present invention.

In the bidirectional optical module according to the third embodiment of the present invention, like the bidirectional optical module according to the first embodiment of the present invention, the reflection type polarizer which does not come to loss factors for the receiving signal light and the Faraday rotator are disposed at a position where the beam diameter becomes smallest (i.e., in the vicinity of the optical fiber end). Hence, the aperture diameter necessary for the reflection type polarizer and the Faraday rotator each can be made small. This therefore enables achievement of the reduction of production cost. In addition, the wavelength splitting filter is used which has a polarized-light separating function that the same polarized light as the transmitting signal light emitted from the light-emitting device passes through the filter but any polarized light perpendicular thereto does not pass through the filter. Hence, like the bidirectional optical module according to the second embodiment of the present invention, the absorption type polarizer can be omitted and the number of component parts can be reduced. This enables achievement of further reduction of production cost.

Thus, the bidirectional optical module according to the present invention can achieve more reduction of production cost than conventional bidirectional optical modules, and hence has a possibility of industrial utilization.

BRIEF DESCRIPTION OF THE DRAWINGS

FIG. 1A is a schematic illustration of the construction of a bidirectional optical module according to the first embodiment of the present invention. FIG. 1B is a partially enlarged view of FIG. 1A.

FIG. 2A is a schematic illustration of the construction of a bidirectional optical module according to a modification of the first embodiment of the present invention. FIG. 2B is a partially enlarged view of FIG. 2A.

FIG. 3A is a schematic illustration of the construction of a bidirectional optical module according to another modification of the first embodiment of the present invention. FIG. 3B is a partially enlarged view of FIG. 3A.

FIG. 4A is a schematic illustration of the construction of a bidirectional optical module according to the third embodiment of the present invention. FIG. 4B is a partially enlarged view of FIG. 4A.

DESCRIPTION OF THE PREFERRED EMBODIMENTS

Figure 5A:
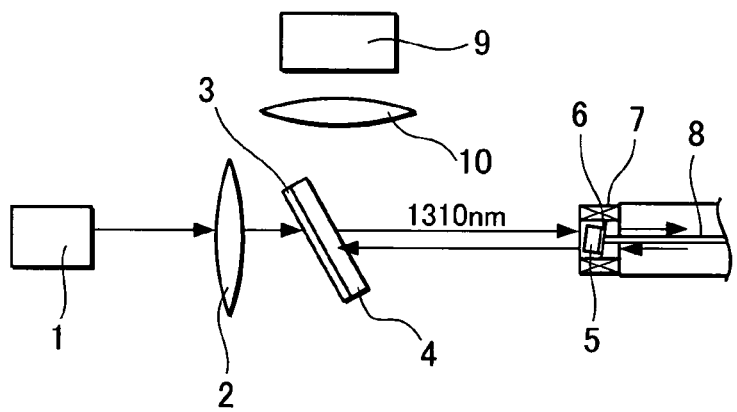
FIGS. 5A and 5B are each a schematic illustration of the construction of a bidirectional optical module according to Example 1.

The present invention is described below in detail.

First, the bidirectional optical module according to the first embodiment of the present invention has, as shown in FIG. 1A, a light-emitting device 1 for emitting transmitting signal light therefrom, an optical fiber 8 which the transmitting signal light emitted from the light-emitting device 1, and collected by a first coupling lens 2, is made to enter, a light-receiving device 9 which receiving signal light made to emerge from the optical fiber and collected by a second coupling lens 10 is made to enter, and a wavelength splitting filter 4 provided at a position that fulfills a requirement that the filter is on an optical path extending between the light-emitting device 1 and the optical fiber 8 and on an optical path extending between the light-receiving device 9 and the optical fiber 8, and is so set up that the transmitting signal light emitted from the light-emitting device 1 is sent outward through the optical fiber 8 and the receiving signal light is sent backward through the optical fiber 8 and received by the light-receiving device 9, which receiving signal light is of at least one wavelength different from that of the transmitting signal light.

This bidirectional optical module also has, as shown in FIG. 1B, an optical device (optical isolator) consisting essentially of a reflection type polarizer 6 bonded to an end face of the optical fiber 8 or disposed in proximity thereto, a Faraday rotator 5 disposed integrally on the reflection type polarizer 6 or disposed in proximity thereto and an absorption type polarizer 3 disposed on an optical path extending between the light-emitting device 1 and the wavelength splitting filter 4.

The reflection type polarizer 6 is required to have a wavelength dependency that it functions as a polarizer for the transmitting signal light but does not function as a polarizer for the receiving signal light. The polarizer having such characteristics may be exemplified by a polarizer formed of photonic crystals produced by a self-cloning process (the polarizer seen in, e.g., Japanese Patent No. 3288976) and a wire grid type polarizer produced by a nanoimprint process (the polarizer seen in, e.g., Japanese National Publication No. 2006-514751).

As described above, the reflection type polarizer 6 is bonded to an end face of the optical fiber 8 or disposed in proximity thereto, and the Faraday rotator 5 is disposed integrally on the reflection type polarizer 6 or disposed in proximity thereto. In this case, it is more preferable that the Faraday rotator 5 and the reflection type polarizer 6 are set integral with each other by the use of an adhesive or the like than that the Faraday rotator is disposed in proximity to the reflection type polarizer 6. This is because the module assemblage can more easily be operated in disposing an optical device formed integrally of the Faraday rotator 5 and the reflection type polarizer 6 than in disposing the Faraday rotator 5 in proximity to the reflection type polarizer 6, and also because the optical device formed integrally of the Faraday rotator 5 and the reflection type polarizer 6 can be set closer to the optical fiber end face where the beams of the transmitting signal light have been narrowed, and this enables the necessary aperture diameter to be set smaller.

Further, in regard to the reflection type polarizer 6, it may directly be formed on the surface of the Faraday rotator; the Faraday rotator being used as a substrate. In the case when the reflection type polarizer is directly formed on the surface of the Faraday rotator, a substrate for the reflection type polarizer can be omitted, and, correspondingly thereto, the Faraday rotator and the reflection type polarizer can be made smaller in total thickness and these can be set closer to the optical fiber end face. This enables the Faraday rotator and the reflection type polarizer to be set in still smaller aperture diameter.

Usually, the optical device formed integrally of the Faraday rotator and the reflection type polarizer is made by cutting what has integrally been formed of a Faraday rotator and a reflection type polarizer which are of about 10 mm square each, cutting it into small pieces of 0.5 mm square each. In this case, the optical device formed integrally of them may preferably have a small total thickness because it can be cut with ease, and this is effective in that a higher yield is achievable when cut into small pieces.

Here, in the bidirectional optical module shown in FIG. 1A, a wavelength splitting filter of a type that it permits the transmitting signal light emitted from the light-emitting device 1 to pass through but reflects the receiving signal light having a wavelength different from that of the transmitting signal light is used as the wavelength splitting filter 4. A wavelength splitting filter may also be used which is of a type that it reflects the transmitting signal light emitted from the light-emitting device 1 but permits the receiving signal light having a wavelength different from that of the transmitting signal light to pass through.

In the bidirectional optical module shown in FIG. 1A, a magnet 7 is also set (see FIG. 1B) which is disposed in the vicinity of the Faraday rotator 5 and makes the Faraday rotator 5 saturated magnetically so as to rotate the plane of polarization by 45 degrees. However, the magnet may be omitted to be set in where a high coercive force type magnetic garnet film which continues to retain a magnetically saturated state even in the absence of an external magnetic field is used in the Faraday rotator.

Then, in the bidirectional optical module shown in FIG. 1A, the transmitting signal light emitted from the light-emitting device 1 is collected by the first coupling lens 2 and passes through the absorption type polarizer 3 first, where the light transmission axis of the absorption type polarizer 3 is adjusted to the direction in which the transmitting signal light can pass therethrough. Next, the transmitting signal light passes through the wavelength splitting filter 4, and the plane of polarization is rotated by 45 degrees in the Faraday rotator 5. Then the transmitting signal light passes through the reflection type polarizer 6, and is thereafter sent forward through the optical fiber 8 to the outside of the bidirectional optical module. As a matter of course, the light transmission axis of the reflection type polarizer 6 is adjusted to the plane of polarization of the transmitting signal light having been rotated by 45 degrees in the Faraday rotator 5.

Meanwhile, transmitting signal light having been reflected on the outside of the bidirectional optical module to have returned therefrom is, even though it has backward passed through the reflection type polarizer 6, intercepted by the absorption type polarizer 3 and by no means returns to the light-emitting device 1 because the plane of polarization is necessarily rotated by the Faraday rotator 5 in the direction perpendicular to the light transmission axis of the absorption type polarizer 3.

Now, commonly available distributed feedback lasers (DFB lasers) have a linear-polarization performance of as high as about 30 dB. This means that the polarization perpendicular to the polarization of oscillated light in a semiconductor laser cavity makes so low a gain as to low contribute to oscillation. Accordingly, it is considered that, even if the light in the direction perpendicular to the polarization of light emitted from the light-emitting device 1 has returned by any chance, it less takes part in making the oscillation unstable than a case in which parallel light has returned. For such a reason, in the bidirectional optical module shown in FIG. 1A, even an optical device constituted of the reflection type polarizer 6 and the Faraday rotator 5, in which the absorption type polarizer 3 is omitted to be set in, is considered to function as an isolator to a certain extent. Here, when such an optical device constituted of the reflection type polarizer 6 and the Faraday rotator 5 is attached to the end face of the optical fiber 8, any projection component in the direction of polarization of the transmitting signal light which is linearly polarized light emitted from the light-emitting device 1, of the polarized light in the return light having backward passed through the optical device may return to the light-emitting device 1 to make the oscillation unstable. Hence, the optical device constituted of the reflection type polarizer 6 and the Faraday rotator 5 must be attached to the end face of the optical fiber 8 in a good precision of direction of the reflection type polarizer 6 set therein.

In the bidirectional optical module shown in FIG. 1A, the reflection type polarizer 6 has a wavelength dependency that it functions as a polarizer for the transmitting signal light but does not function as a polarizer for the receiving signal light. Hence, the receiving signal light having been sent backward from the outside of the bidirectional optical module passes through the reflection type polarizer 6 as it is, because the reflection type polarizer 6 acts as a mere transparent element with respect to the receiving signal light, and the receiving signal light enters the wavelength splitting filter 4 through the Faraday rotator 5. Then, the receiving signal light is reflected by the wavelength splitting filter 4, where its optical path is bent by 90 degrees. Thereafter, the receiving signal light is collected by the second coupling lens 10 to come to enter the light-receiving device 9, thus the signals are received.

FIGS. 2A and 2B illustrate a bidirectional optical module according to a modification of the first embodiment of the present invention. In this bidirectional optical module, the absorption type polarizer 3 and the wavelength splitting filter 4 are laminated to each other to stand integrated. Hence, compared with the bidirectional optical module shown in FIG. 1A, in the module of which the absorption type polarizer 3 and the wavelength splitting filter 4 are separately set in, these can favorably be set in the module by easy operation.

In the bidirectional optical modules shown in FIGS. 1A and 2A, the transmitting signal light emitted from the light-emitting device 1 is collected by the first coupling lens 2 and the receiving signal light emerging from the optical fiber 8 is collected by the different second coupling lens 10. However, as shown in FIGS. 3A and 3B, the first coupling lens 2 and the second coupling lens 10 may be omitted to be set in, to provide a structure wherein the transmitting signal light and the receiving signal light are each collected by a third coupling lens 12 disposed on an optical path extending between the wavelength splitting filter 4 and the optical fiber 8.

FIGS. 4A and 4B illustrate a bidirectional optical module according to the third embodiment of the present invention, in which, in respect of the wavelength splitting filter 4 of the bidirectional optical module shown in FIG. 1A, the filter is made to have a polarized-light separating function for the transmitting signal light emitted from the light-emitting device 1, to make the absorption type polarizer 3 omitted to be set in.

More specifically, this bidirectional optical module according to the third embodiment of the present invention has, as shown in FIG. 4A, a light-emitting device 1 for emitting transmitting signal light therefrom; an optical fiber 8 which the transmitting signal light emitted from the light-emitting device 1, and collected by a first coupling lens 2, is made to enter; a light-receiving device 9 which receiving signal light made to emerge from the optical fiber and collected by a second coupling lens 10 is made to enter; a wavelength splitting filter 4 provided at a position that fulfills a requirement that the filter is on an optical path extending between the light-emitting device 1 and the optical fiber 8 and on an optical path extending between the light-receiving device 9 and the optical fiber 8, and having a polarized-light separating function that the same polarized light as the transmitting signal light emitted from the light-emitting device 1 passes through the filter but any polarized light perpendicular thereto does not pass through the filter; and a cut filter 11 provided on an optical path extending between this wavelength splitting filter 4 and the light-receiving device 9 and permits the receiving signal light to pass through but cuts off the transmitting signal light; and is so set up that the transmitting signal light emitted from the light-emitting device 1 is sent forward through the optical fiber 8 to the outside and the receiving signal light is sent backward through the optical fiber 8 and received by the light-receiving device 9, which receiving signal light is of at least one wavelength different from the wavelength of the transmitting signal light.

In this bidirectional optical module, an optical device is also set in as shown in FIG. 4B, which consists essentially of a reflection type polarizer 6 bonded to an end face of the optical fiber 8 or disposed in proximity thereto and a Faraday rotator 5 disposed integrally on the reflection type polarizer 6 or disposed in proximity thereto. Combination of this optical device with the wavelength splitting filter 4 shown in FIG. 4A and having the polarized-light separating function sets up an optical isolator.

Here, in order for the wavelength splitting filter 4 to be provided with the polarized-light separating function, it can be done by devising layer configuration of a dielectric multilayer film. In the case when the wavelength splitting filter 4 is to be provided with the polarized-light separating function by devising layer configuration of a dielectric multilayer film, the filter may be so set as to function as a polarizer for the light having a longer wavelength in the two types of light which have different wavelengths. This is preferable because the filter can enjoy broader wavelength range where it functions as the polarizer.

Like the bidirectional optical module shown in FIG. 1A, the above reflection type polarizer 6 is required to have a wavelength dependency that it functions as a polarizer for the transmitting signal light but does not function as a polarizer for the receiving signal light. The polarizer having such characteristics may be exemplified by a polarizer formed of photonic crystals produced by a self-cloning process (the polarizer seen in, e.g., Japanese Patent No. 3288976) and a wire grid type polarizer produced by a nanoimprint process (the polarizer seen in, e.g., Japanese National Publication No. 2006-514751).

The above reflection type polarizer 6 is bonded to an end face of the optical fiber 8 or disposed in proximity thereto, and the Faraday rotator 5 is disposed integrally on the reflection type polarizer 6 or disposed in proximity thereto. In this case, it is more preferable that the Faraday rotator 5 and the reflection type polarizer 6 are set integral with each other by the use of an adhesive or the like than that the Faraday rotator is disposed in proximity to the reflection type polarizer 6. This is because the module assemblage can more easily be operated in disposing an optical device formed integrally of the Faraday rotator 5 and the reflection type polarizer 6 than in disposing the Faraday rotator 5 in proximity to the reflection type polarizer 6, and also because the optical device formed integrally of the Faraday rotator 5 and the reflection type polarizer 6 can be set closer to the optical fiber end face where the beams of the transmitting signal light have been narrowed, and this enables the necessary aperture diameter to be set smaller. Further, in regard to the above reflection type polarizer 6, it may directly be formed on the surface of the Faraday rotator 5; the Faraday rotator 5 being used as a substrate. In the case when the reflection type polarizer 6 is directly formed on the surface of the Faraday rotator 5, a substrate for the reflection type polarizer 6 can be omitted, and, correspondingly thereto, the Faraday rotator 5 and the reflection type polarizer 6 can be made smaller in total thickness and these can be set closer to the optical fiber 8 end face. This enables the Faraday rotator 5 and the reflection type polarizer 6 to be set in still smaller aperture diameter. Usually, the optical device formed integrally of the Faraday rotator 5 and the reflection type polarizer 6 is made by cutting what has integrally been formed of a Faraday rotator 5 and a reflection type polarizer 6 which are of about 10 mm square each, cutting it into small pieces of 0.5 mm square each. In this case, the optical device formed integrally of them may preferably have a small total thickness because it can be cut with ease, and this is effective in that a higher yield is achievable when cut into small pieces.

In the bidirectional optical module according to the third embodiment of the present invention, a magnet 7 is also set (see FIG. 4B) which is disposed in the vicinity of the Faraday rotator 5 and makes the Faraday rotator 5 saturated magnetically so as to rotate the plane of polarization by 45 degrees. However, like the bidirectional optical module shown in FIG. 1A, the magnet may be omitted to be set in where a high coercive force type magnetic garnet film which continues to retain a magnetically saturated state even in the absence of an external magnetic field is used in the Faraday rotator.

Then, in the bidirectional optical module shown in FIG. 4A, the transmitting signal light emitted from the light-emitting device 1 is collected by the first coupling lens 2 and then passes through the wavelength splitting filter 4 having the polarized-light separating function, and the plane of polarization is rotated by 45 degrees in the Faraday rotator 5. Then the transmitting signal light passes through the reflection type polarizer 6, and is thereafter sent forward through the optical fiber 8 to the outside of the bidirectional optical module. As a matter of course, the light transmission axis of the reflection type polarizer 6 is adjusted to the plane of polarization of the transmitting signal light having been rotated by 45 degrees in the Faraday rotator 5.

Meanwhile, transmitting signal light having been reflected on the outside of the bidirectional optical module to have returned therefrom is, even though it has backward passed through the reflection type polarizer 6, reflected by the wavelength splitting filter 4 in virtue of its polarized-light separating function and by no means returns to the light-emitting device 1 because the plane of polarization is necessarily rotated by the Faraday rotator 5 in the direction perpendicular to the polarized-light transmission axis of the wavelength splitting filter 4 through which the transmitting signal light has forward passed. However, the transmitting signal light having been reflected on the outside of the bidirectional optical module to have returned therefrom and have been reflected by the wavelength splitting filter 4 goes to the light-receiving device 9 through the same optical path as the receiving signal light. Hence, the cut filter 11 is provided on the optical path extending between the wavelength splitting filter 4 and the light-receiving device 9, which cut filter permits the receiving signal light to pass through but cuts off the transmitting signal light, and is so set that the transmitting signal light having been reflected on the outside of the bidirectional optical module to have returned therefrom can be prevented from entering the light-receiving device 9. A mirror formed of a dielectric multilayer film may be used as the cut filter 11. In the cut filter making use of this mirror formed of a dielectric multilayer film, the transmitting signal light having returned is reflected so that this transmitting signal light can not enter the light-receiving device. Accordingly, in order that the transmitting signal light reflected by the cut filter is so made as not to follow the original optical path again, it is effective to somewhat incline the cut filter with respect to incident light so that the light may not vertically enter the cut filter.

In the bidirectional optical module shown in FIG. 4A, the reflection type polarizer 6 has the wavelength dependency that it functions as a polarizer for the transmitting signal light but does not function as a polarizer for the receiving signal light. Hence, the receiving signal light having been sent backward from the outside of the bidirectional optical module passes through the reflection type polarizer 6 as it is, because the reflection type polarizer 6 acts as a mere transparent element with respect to the receiving signal light, and the receiving signal light enters the wavelength splitting filter 4 having the polarized-light separating function, through the Faraday rotator 5. Then, the receiving signal light is reflected by the wavelength splitting filter 4, where its optical path is bent by 90 degrees. This receiving signal light passes through the cut filter 11, and is thereafter collected by the second coupling lens 10 to come to enter the light-receiving device 9, thus the signals are received. Here, like the bidirectional optical modules shown in FIG. 1A, the first coupling lens 2 and the second coupling lens 10 may be omitted to be set in, to provide a structure wherein the transmitting signal light and the receiving signal light are each collected by a third coupling lens (not shown) disposed on an optical path extending between the wavelength splitting filter 4 and the optical fiber 8.

The present invention is described below in greater detail by giving Examples.

Example 1

Figure 5B:
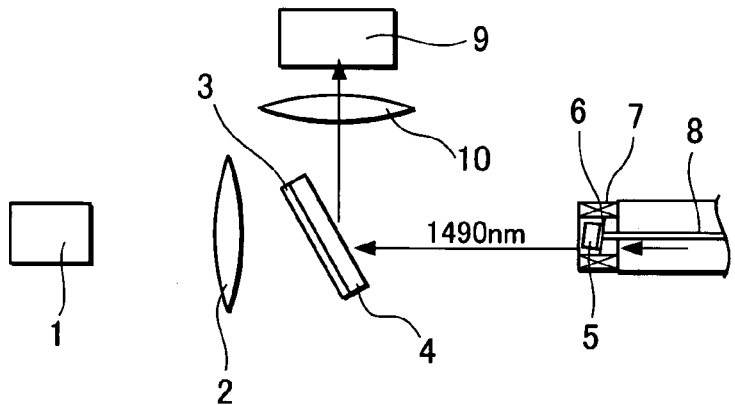

In a bidirectional optical module according to Example 1, as shown in FIGS. 5A and 5B, an absorption type polarizer 3 and a wavelength splitting filter 4 are laminated to each other to stand integrated.

In a light-emitting device 1, a distributed feedback laser (DFB laser) is used which emits light signals of 1,310 nm in wavelength.

Transmitting signal light which is linearly polarized light of 1,310 nm in wavelength having been emitted from the light-emitting device 1 passes, as shown in FIG. 5A, through a first coupling lens 2 which makes the transmitting signal light converge, to reach the absorption type polarizer 3. This absorption type polarizer 3 is disposed in the direction in which the transmitting signal light which is linearly polarized light having been emitted from the light-emitting device 1 passes through. Hence, the transmitting signal light reaches the wavelength splitting filter 4 without any attenuation.

The wavelength splitting filter 4 makes use of a filter which permits the transmitting signal light of 1,310 nm in wavelength to pass through but reflects light of 1,490 nm in wavelength which is receiving signal light, and hence the transmitting signal light passes through the wavelength splitting filter 4 to reach a Faraday rotator 5.

Next, this transmitting signal light, after its plane of polarization has been rotated by 45 degrees in the Faraday rotator, which is formed of a magnetic garnet film kept magnetically saturated by a magnet 7, enters a reflection type polarizer 6. In this reflection type polarizer 6, its light transmission axis is kept shifted by 45 degrees with respect to the light transmission axis of the absorption type polarizer 3. Thus, the transmitting signal light the plane of polarization of which has been rotated by 45 degrees in the Faraday rotator coincides in light transmission axis with the reflection type polarizer 6, and hence is sent forward through the optical fiber 8 to the outside of the module without any attenuation.

As the reflection type polarizer 6, the wire grid type polarizer produced by a nanoimprint process was used. This reflection type polarizer 6 was directly formed on the Faraday rotator 5 to obtain an optical device formed integrally of these. This was used after it was cut in a size of 0.5 mm square, and bonded, on the side of the reflection type polarizer 6, to the end face of the optical fiber 8.

Next, reflection return light thrown back from the optical fiber 8 upon reflection at its coupling end faces and other discontinuous interfaces passes in the direction reverse to the order described above. As shown in FIG. 5A, only the light in the direction of light transmission axis of the reflection type polarizer 6 passes through the reflection type polarizer 6, and enters the Faraday rotator 5 as the reflection return light. Optical components other than it are reflected at the reflection type polarizer 6 to return naturally to the optical fiber 8. However, the end face of the optical fiber 8 is beforehand so structured as to be inclined by 6 degrees or more, whereby such light signals can not travel through the optical fiber 8 to come to attenuate.

As to the reflection return light having returned to the Faraday rotator 5, its plane of polarization is rotated by 45 degrees, where the plane of polarization is so rotated as to fall at right angles with the light transmission axis of the absorption type polarizer 3, and returns to the wavelength splitting filter 4. Next, it passes through the wavelength splitting filter 4 and reaches the absorption type polarizer 3. Since, however, the reflection return light having returned there is the light the plane of polarization falls at right angles with the light transmission axis of the absorption type polarizer 3, it is absorbed by the absorption type polarizer 3. Thus, it follows that the reflection return light does not come to return to the light-emitting device 1 formed of the distributed feedback laser (DFB laser), which tends to be affected by reflection return light.

Now, where the absorption type polarizer 3 is omitted to be set in, in respect of the polarization of light passing through an optical device constituted of the reflection type polarizer 6 and the Faraday rotator 5 and returning to the light-emitting device 1, the optical device may be so disposed that the polarization of return light is at an angle of about plus/minus 5° to the direction perpendicular to the direction of polarization of the transmitting signal light which is the linearly polarized light emitted from the light-emitting device 1. This enables sufficient control of the return light that makes the oscillation from the light-emitting device 1 unstable.

Figure 6:
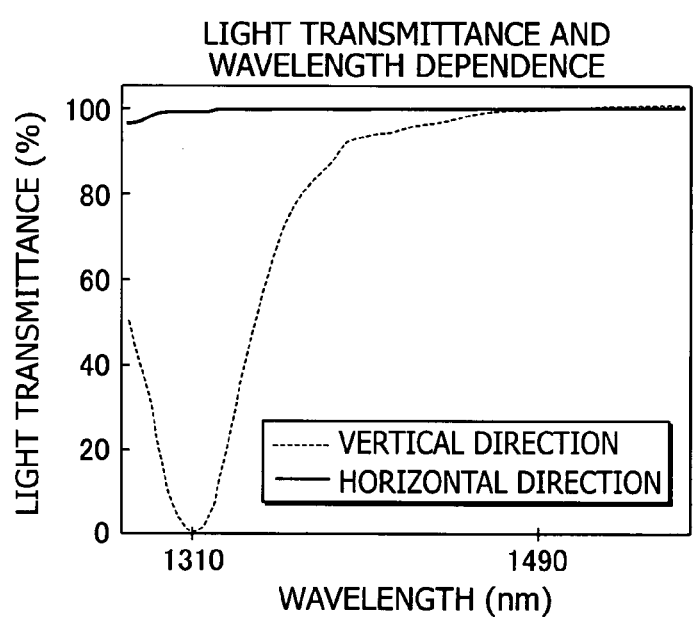
FIG. 6 is a graph showing light transmittance and wavelength dependence, of a reflection type polarizer set in the bidirectional optical module according to Example 1.

Characteristics of the reflection type polarizer 6 used in this Example are shown in FIG. 6. This reflection type polarizer, where polarized light directed vertically to the direction of light transmission axis enters it, shows a low light transmittance of substantially 0% with respect to light signals of 1,310 nm in wavelength and such light signals can not pass through the polarizer to come reflected, whereas it shows a high light transmittance of substantially 100% with respect to light signals of 1,490 nm in wavelength and such light signals pass therethrough without being reflected, as shown by a dotted line in the FIG. 6 graph. On the contrary, in the case of polarized light directed horizontally to the direction of light transmission axis, the reflection type polarizer shows a high light transmittance of substantially 100% with respect to both the light signals of 1,310 nm in wavelength and the light signals of 1,490 nm in wavelength and such light signals pass through the polarizer without being reflected, as shown by a solid line in the FIG. 6 graph. That is, it acts as the reflection type polarizer with respect to light of 1,310 nm in wavelength but does not act as any polarizer with respect to light of 1,490 nm in wavelength, and is a mere transparent element. Thus, when the light signals of 1,490 nm in wavelength are received through the optical fiber, as shown in FIG. 5B the light passes through the reflection type polarizer 6 even though receiving signal light of 1,490 nm in wavelength and standing polarized in any direction comes to enter the polarizer from the optical fiber 8, and enters the wavelength splitting filter 4 through the Faraday rotator 5. The receiving signal light of 1,490 nm in wavelength having entered the wavelength splitting filter 4 is reflected by the wavelength splitting filter 4 and enters the light-receiving device 9 through a second coupling lens 10.

In this way, among two polarizers and one Faraday rotator which constitute an optical isolator, the Faraday rotator and the reflection type polarizer may be disposed at the optical fiber end face. This enables the module to have the function of a small-sized optical isolator and also have the function of the bidirectional optical module.

In the foregoing, the bidirectional optical module of Example 1 has been described with reference to schematic illustrations, on its positional relationship between respective component parts only. The respective component parts are held in a package made of a resin or a metal to set up the bidirectional optical module. In such an occasion, the light-emitting device is held in the package and the optical fiber is joined to the package.

Example 2

In a bidirectional optical module according to Example 2, a distributed feedback laser (DFB laser) which emits light signals of 1,490 nm in wavelength is used in a light-emitting device 1.

Figure 7A:
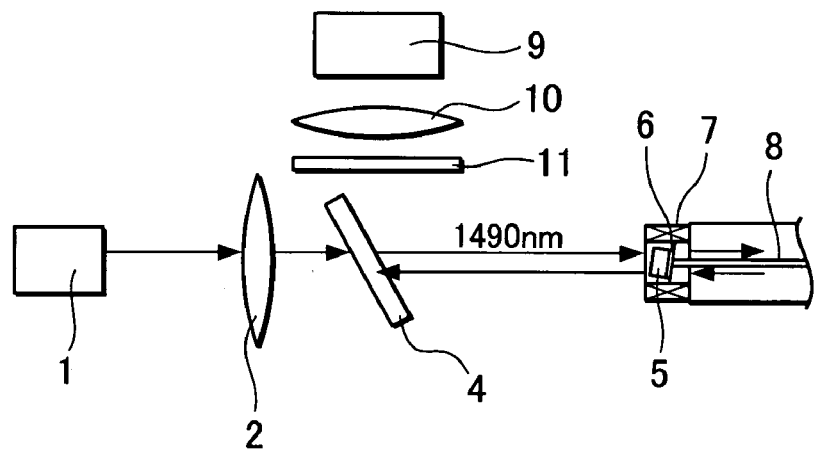
FIGS. 7A and 7B are each a schematic illustration of the construction of a bidirectional optical module according to Example 2.

Transmitting signal light which is linearly polarized light of 1,490 nm in wavelength having been emitted from the light-emitting device 1 passes, as shown in FIG. 7A, through a first coupling lens 2 which makes the transmitting signal light converge, to reach a wavelength splitting filter 4 having the polarized-light separating function for the transmitting signal light.

The wavelength splitting filter 4 makes use of a dielectric multilayer film filter which permits the linearly polarized light transmitting signal light of 1,490 nm in wavelength to pass through but reflects linearly polarized light falling at right angles with the former linearly polarized light and light of 1,310 nm in wavelength which is receiving signal light, and hence the transmitting signal light passes through the wavelength splitting filter 4 to reach a Faraday rotator 5.

Next, this transmitting signal light, after its plane of polarization has been rotated by 45 degrees in the Faraday rotator, which is formed of a magnetic garnet film kept magnetically saturated by a magnet 7, enters a reflection type polarizer 6. In this reflection type polarizer 6, its light transmission axis is kept shifted by 45 degrees with respect to the polarized-light transmission axis of the wavelength splitting filter 4 through which the transmitting signal light passes. Thus, the transmitting signal light the plane of polarization of which has been rotated by 45 degrees in the Faraday rotator 5 coincides in light transmission axis with the reflection type polarizer 6, and hence is sent forward through the optical fiber 8 to the outside of the module without any attenuation.

As the reflection type polarizer 6, the wire grid type polarizer produced by a nanoimprint process was used. This reflection type polarizer 6 was directly formed on the Faraday rotator 5 to obtain an optical device formed integrally of these. This was used after it was cut in a size of 0.5 mm square, and bonded, on the side of the reflection type polarizer 6, to the end face of the optical fiber 8.

Next, reflection return light thrown back from the optical fiber 8 upon reflection at its coupling end faces and other discontinuous interfaces passes in the direction reverse to the order described above. As shown in FIG. 7A, only the light in the direction of light transmission axis of the reflection type polarizer 6 passes through the reflection type polarizer 6, and enters the Faraday rotator 5 as the reflection return light. Optical components other than it are reflected at the reflection type polarizer 6 to return naturally to the optical fiber 8. However, the end face of the optical fiber 8 is beforehand so structured as to be inclined by 6 degrees or more, whereby such light signals can not travel through the optical fiber 8 to come to attenuate.

As to the reflection return light having returned to the Faraday rotator 5, its plane of polarization is rotated by 45 degrees, where the plane of polarization is so rotated as to fall at right angles with the transmitting signal light polarized-light transmission axis of the wavelength splitting filter 4, and hence reflected by the wavelength splitting filter 4. Thus, it follows that the reflection return light does not come to return to the light-emitting device 1 formed of the distributed feedback laser (DFB laser), which tends to be affected by reflection return light. Incidentally, the transmitting signal light having been reflected by the wavelength splitting filter 4 goes to the light-receiving device 9 through the same optical path as the receiving signal light. However, this light is intercepted by a cut filter 11 disposed on this side of the light-receiving device 9, and hence by no means enter the light-receiving device 9.

Figure 7B:
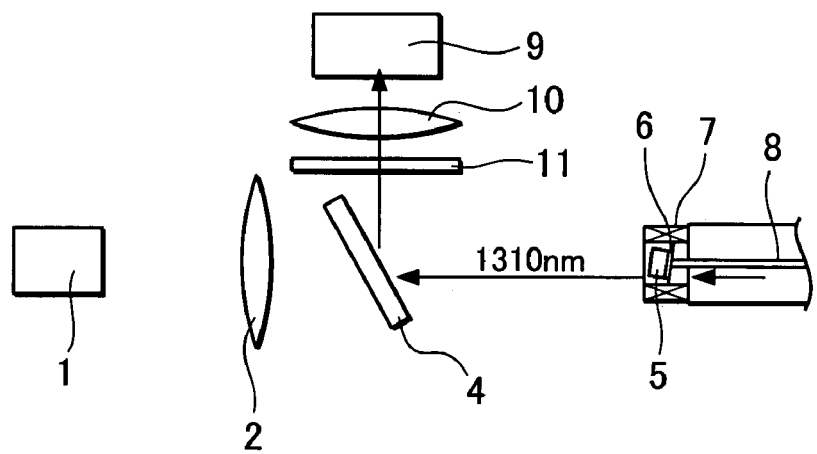
Figure 8:
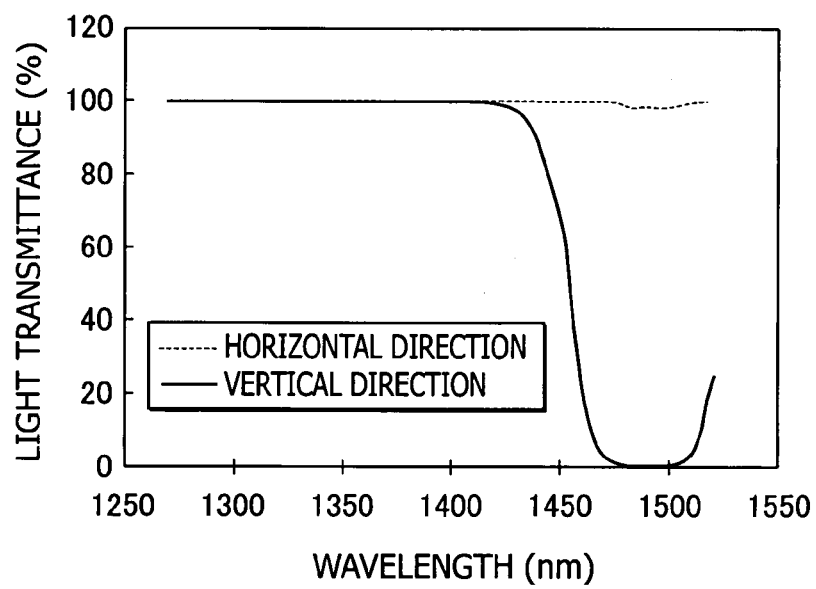
FIG. 8 is a graph showing light transmittance and wavelength dependence, of a reflection type polarizer set in the bidirectional optical module according to Example 2.

Characteristics of the reflection type polarizer 6 used in this Example are shown in FIG. 8. This reflection type polarizer 6, where polarized light directed vertically to the direction of light transmission axis enters it, shows a low light transmittance of substantially 0% with respect to light signals of 1,490 nm in wavelength and such light signals can not pass through the polarizer to come reflected, whereas it shows a high light transmittance of substantially 100% with respect to light signals of 1,310 nm in wavelength and such light signals pass therethrough without being reflected, as shown by a solid line in the FIG. 8 graph. On the contrary, in the case of polarized light directed horizontally to the direction of light transmission axis, the reflection type polarizer shows a high light transmittance of substantially 100% with respect to both the light signals of 1,490 nm in wavelength and the light signals of 1,310 nm in wavelength and such light signals pass through the polarizer without being reflected, as shown by a dotted line in the FIG. 8 graph. That is, it acts as the reflection type polarizer with respect to light of 1,490 nm in wavelength but does not act as any polarizer with respect to light of 1,310 nm in wavelength, and is a mere transparent element. Thus, when the light signals of 1,310 nm in wavelength are received through the optical fiber, as shown in FIG. 7B the light passes through the reflection type polarizer 6 even though receiving signal light of 1,310 nm in wavelength and standing polarized in any direction comes to enter the polarizer from the optical fiber 8, and enters the wavelength splitting filter 4 through the Faraday rotator 5. The receiving signal light of 1,310 nm in wavelength having entered the wavelength splitting filter 4 is reflected by the wavelength splitting filter 4 and enters the light-receiving device 9 through the cut filter 11 and a second coupling lens 10.

Figure 9:
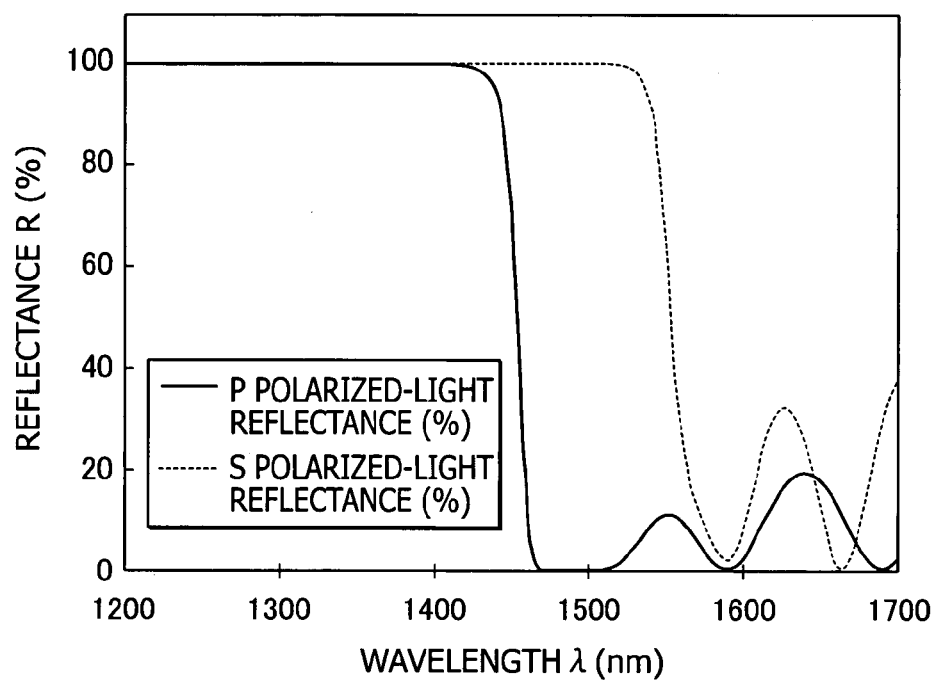
FIG. 9 is a graph showing wavelength dependence and polarization dependence, of the reflectance of a wavelength splitting filter set in the bidirectional optical module according to Example 2.
Figure 10:
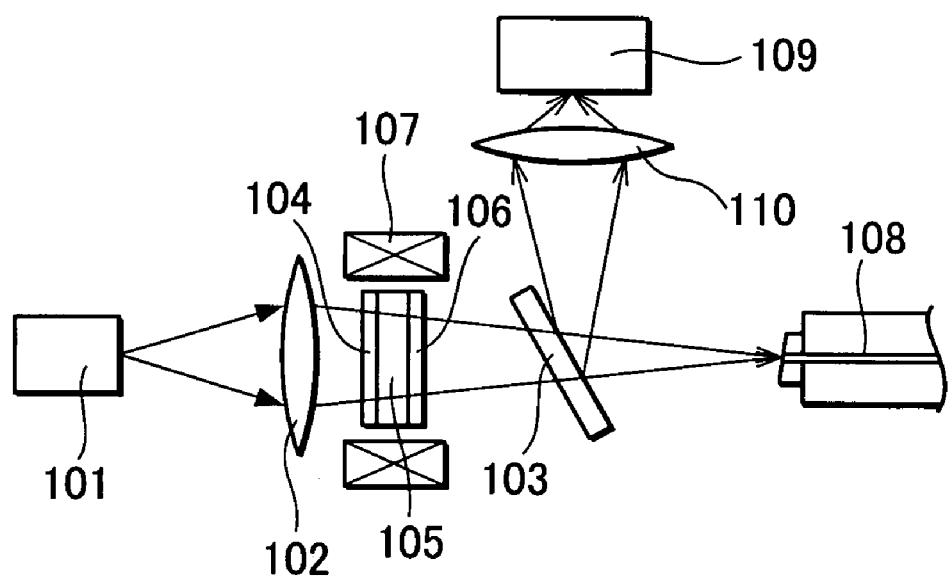
FIG. 10 is a schematic illustration of the construction of a conventional bidirectional optical module.

Characteristics of the wavelength splitting filter 4 used in this Example are shown in FIG. 9. With respect to light of 1,310 nm in wavelength, the filter reflects both P polarized light and S polarized light substantially completely. With respect to light of 1,490 nm in wavelength, the filter reflects S polarized light substantially completely, but, in regard to the P polarized light, permits it to pass substantially completely. Thus, it is seen that the filter functions as a polarizer. Here, a non-reflective coating for the light of 1,490 nm in wavelength is provided on opposite side of a glass substrate of the wavelength splitting filter. Also, the wavelength splitting filter used in Example 2 has a polarized-light extinction ratio to the transmitting signal light, of 30 dB or more. In the bidirectional optical module, the device acts sufficiently as an optical isolator as long as the polarized-light extinction ratio is at least 10 dB.

In this way, among two polarizers and one Faraday rotator which constitute an optical isolator, the Faraday rotator and the reflection type polarizer having wavelength characteristics may be disposed at the optical fiber end face to make the wavelength splitting filter have the function of another polarizer. This enables the module to have the function of a small-sized optical isolator and also have the function of the bidirectional optical module.

In the foregoing, the bidirectional optical module of Example 2 has also been described with reference to schematic illustrations, on its positional relationship between respective component parts only. The respective component parts are held in a package made of a resin or a metal to set up the bidirectional optical module. In such an occasion, the light-emitting device is held in the package and the optical fiber is joined to the package.

What is claimed is:

1. A bidirectional optical module comprising a light-emitting device for emitting transmitting signal light therefrom, an optical fiber which the transmitting signal light emitted from the light-emitting device is made to enter, a light-receiving device which receiving signal light made to emerge from the optical fiber is made to enter, and a wavelength splitting filter provided at a position that fulfills a requirement that the filter is on an optical path extending between the light-emitting device and the optical fiber and on an optical path extending between the light-receiving device and the optical fiber; the transmitting signal light emitted from the light-emitting device being sent forward through the optical fiber, and the receiving signal light being sent backward through the optical fiber and received by the light-receiving device, which receiving signal light is of at least one wavelength different from the wavelength of the transmitting signal light; wherein;

the bidirectional optical module comprises an optical device consisting essentially of a reflection type polarizer bonded to an end face of the optical fiber or disposed in proximity thereto, a Faraday rotator disposed integrally on the reflection type polarizer or disposed in proximity thereto and an absorption type polarizer disposed on an optical path extending between the light-emitting device and the wavelength splitting filter, and the reflection type polarizer has a wavelength dependency that it functions as a polarizer for the transmitting signal light but does not function as a polarizer for the receiving signal light.

2. The bidirectional optical module according to claim 1, wherein the absorption type polarizer and the wavelength splitting filter are laminated to each other to stand integrated.

3. A bidirectional optical module comprising a light-emitting device which is formed of a semiconductor laser having a high linear-polarization performance and is for emitting transmitting signal light therefrom, an optical fiber which the transmitting signal light emitted from the light-emitting device is made to enter, a light-receiving device which receiving signal light made to emerge from the optical fiber is made to enter, and a wavelength splitting filter provided at a position that fulfills a requirement that the filter is on an optical path extending between the light-emitting device and the optical fiber and on an optical path extending between the light-receiving device and the optical fiber; the transmitting signal light emitted from the light-emitting device being sent forward through the optical fiber, and the receiving signal light being sent backward through the optical fiber and received by the light-receiving device, which receiving signal light is of at least one wavelength different from the wavelength of the transmitting signal light; wherein;

the bidirectional optical module comprises an optical device consisting essentially of a reflection type polarizer bonded to an end face of the optical fiber or disposed in proximity thereto and a Faraday rotator disposed integrally on the reflection type polarizer or disposed in proximity thereto, and the reflection type polarizer has a wavelength dependency that it functions as a polarizer for the transmitting signal light but does not function as a polarizer for the receiving signal light.

4. The bidirectional optical module according to claim 3, wherein the light-emitting device comprises a distributed feedback laser (DFB laser) having a linear-polarization performance of 30 dB or more.

5. A bidirectional optical module comprising a light-emitting device for emitting transmitting signal light therefrom, an optical fiber which the transmitting signal light emitted from the light-emitting device is made to enter, a light-receiving device which receiving signal light made to emerge from the optical fiber is made to enter, and a wavelength splitting filter provided at a position that fulfills a requirement that the filter is on an optical path extending between the light-emitting device and the optical fiber and on an optical path extending between the light-receiving device and the optical fiber; the transmitting signal light emitted from the light-emitting device being sent forward through the optical fiber, and the receiving signal light being sent backward through the optical fiber and received by the light-receiving device, which receiving signal light is of at least one wavelength different from the wavelength of the transmitting signal light; wherein;

the wavelength splitting filter has a polarized-light separating function that the same polarized light as the transmitting signal light emitted from the light-emitting device passes through the filter but any polarized light perpendicular thereto does not pass through the filter; and the bidirectional optical module comprises an optical device consisting essentially of a reflection type polarizer bonded to an end face of the optical fiber or disposed in proximity thereto and a Faraday rotator disposed integrally on the reflection type polarizer or disposed in proximity thereto, which reflection type polarizer has a wavelength dependency that it functions as a polarizer for the transmitting signal light but does not function as a polarizer for the receiving signal light, and further comprises a cut filter provided on an optical path extending between the wavelength splitting filter and the light-receiving device, which cut filter permits the receiving signal light to pass through but cuts off the transmitting signal light.

6. The bidirectional optical module according to claim 1, 3 or 5, wherein the reflection type polarizer is directly formed on the surface of the Faraday rotator.

7. The bidirectional optical module according to claim 5, wherein the wavelength splitting filter having the polarized-light separating function has a polarized-light extinction ratio to the transmitting signal light, of 10 dB or more.

8. The bidirectional optical module according to claim 1, 3 or 5, wherein the reflection type polarizer comprises a wire grid type polarizer produced by a nanoimprint process.

9. The bidirectional optical module according to claim 1, 3 or 5, wherein a magnet is set therein which is disposed in the vicinity of the Faraday rotator and makes the Faraday rotator saturated magnetically.

* * * * *